(12) United States Patent
Drexler et al.

(10) Patent No.: US 12,470,840 B1
(45) Date of Patent: Nov. 11, 2025

(54) ELECTRONICALLY FOCUSABLE DIGITAL ADAPTIVE OPTICS ENCODER MODULE

(71) Applicant: Naval Information Warfare Center Pacific, San Diego, CA (US)

(72) Inventors: Kyle Drexler, San Diego, CA (US); Benjamin Laxton, San Diego, CA (US); Skylar Lilledahl, El Cajon, CA (US); Burton H Neuner, III, Escondido, CA (US); Jesus Rodolfo Perez Cuarenta, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 68 days.

(21) Appl. No.: 18/626,414

(22) Filed: May 13, 2024

(51) Int. Cl.
  *H04N 23/95* (2023.01)
  *G01D 5/347* (2006.01)

(52) U.S. Cl.
  CPC ........... *H04N 23/95* (2023.01); *G01D 5/3473* (2013.01)

(58) Field of Classification Search
  CPC ...... H04N 23/95; H04N 13/239; H04N 23/56; H10F 77/959; H10F 39/182; G01D 5/3473; H01F 38/14
  See application file for complete search history.

(56) References Cited

U.S. PATENT DOCUMENTS

| | | | |
|---|---|---|---|
| 7,164,523 B2 * | 1/2007 | Ishii | G02B 27/0025 359/290 |
| 8,164,037 B2 * | 4/2012 | Jenkins | F41G 7/226 250/203.1 |
| 11,353,556 B2 * | 6/2022 | Pacala | G01S 7/4865 |
| 11,604,342 B2 * | 3/2023 | Hillman | G02B 21/367 |
| 11,703,318 B1 | 7/2023 | Drexler | |
| 12,379,575 B2 * | 8/2025 | Laxton | G01J 9/0215 |
| 2016/0004920 A1 * | 1/2016 | Armstrong-Crews | G01B 11/2513 348/46 |

OTHER PUBLICATIONS

Unpublished U.S. Appl. No. 17/873,333, filed Jul. 22, 2022; All pages are relevant.

* cited by examiner

*Primary Examiner* — Hung H Lam
(74) *Attorney, Agent, or Firm* — Naval Information Warfare Center Pacific; Kyle Eppele

(57) ABSTRACT

A digital adaptive optics encoder module includes a collection lens assembly, an input mounting flange, a collimating lens, a bandpass filter, digital adaptive optic elements, a refocusing lens, an output mounting flange, a housing, a focal plane array, a compute module, and a computing device. The collection lens assembly includes a moveable sub-lens and an entrance lens. The focal plane array measures, records, and transmits light data to a compute module. The compute module is connected to the focal plane array to receive the light data and transmit instructions to autofocus the collection lens assembly based on the light data and a storage device capable of sending and receiving the light data and storing the instructions. The computing device is capable of receiving and recording light data and images produced by the digital adaptive optics encoder module.

20 Claims, 3 Drawing Sheets

ELECTRONICALLY FOCUSABLE DIGITAL ADAPTIVE OPTICS ENCODER MODULE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 211893.

BACKGROUND

Light propagating through the Earth's atmosphere encounters atmospheric turbulence, which causes dynamic temperature and pressure fluctuations, and these fluctuations randomly vary the index of refraction throughout the Earth's atmosphere. Thus, light propagating through the Earth's atmosphere collects wavefront phase errors that degrade imaging performance through the atmospheric turbulence when compared to a homogenous environment such as the vacuum of space. This effect is particularly pronounced in astronomic telescope applications, but similar degradations may occur in other scenarios such as terrestrial telephoto imaging and airborne surveillance. A number of techniques are used to correct imaging distortion. For example, wavefront sensors (e.g., Shack-Hartmann wavefront sensor) with a beacon, one or more adaptive mirrors, and real-time digital processing compose the traditional adaptive optics techniques employed on many astronomy telescopes. Additionally, there are post-processing techniques that attempt to correct imaging distortion. These may include methods that build up temporal statistics of scene fluctuations or methods that attempt to estimate a blur kernel from a single image.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Figure 1:
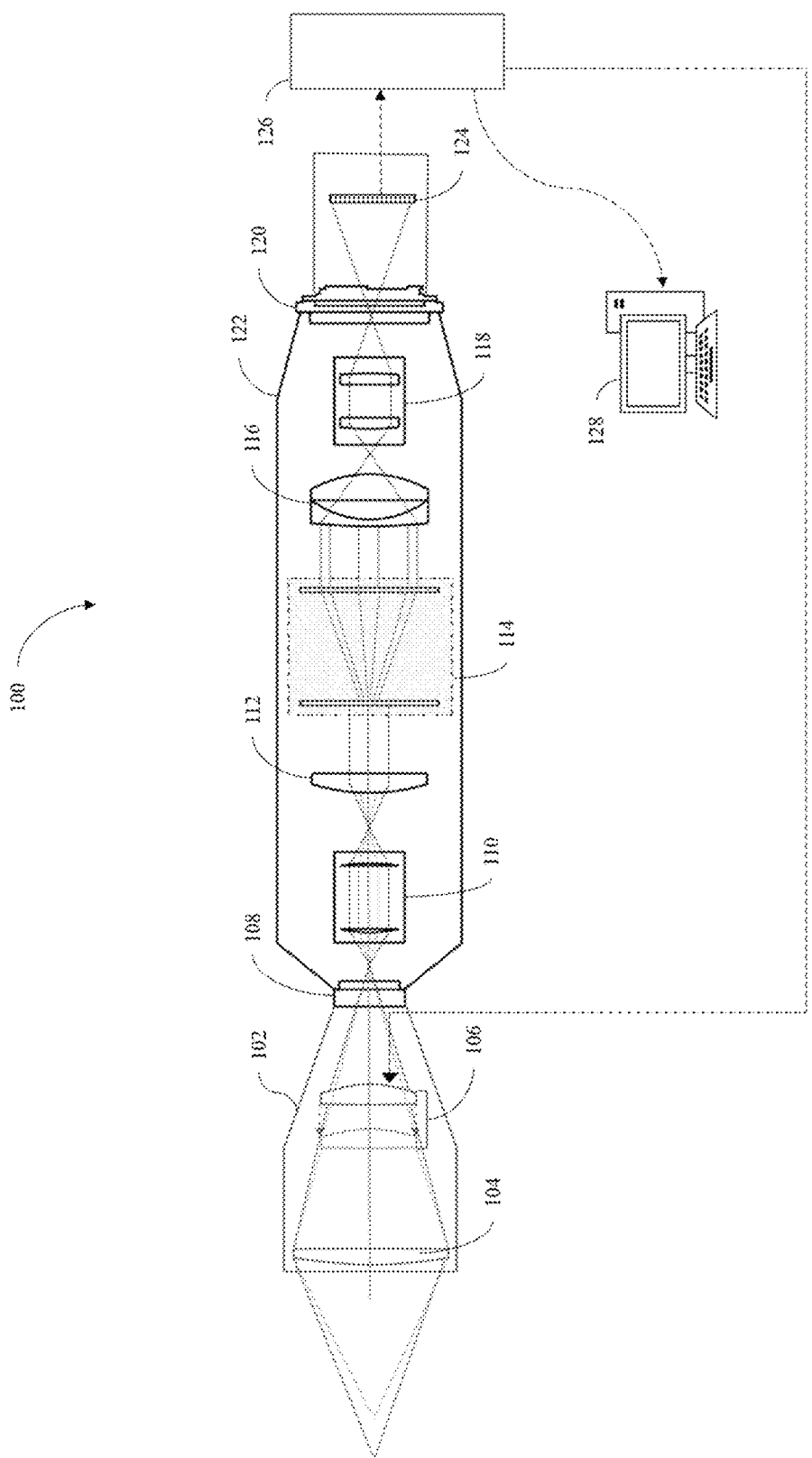
FIG. 1 is a cross-sectional view of an example of the digital adaptive optics encoder module disclosed herein.

Correcting atmospheric turbulence or image distortion is a persistent challenge for long-range imaging systems. Adaptive optics techniques include LASER guide stars and wavefront sensors (e.g., Shack-Hartmann wavefront sensor) combined with post processing techniques, such as methods that build up temporal statistics of scene fluctuations or methods that attempt to estimate a blur kernel from a single image. In both cases, without a known beacon or target object in the scene, the blur kernel is only a statistical estimate and the estimated blur is removed through various deconvolution methods. However, none of these devices combined with the post processing techniques are modular. Currently, most adaptive optics techniques are built into the imaging system, unable to be used in other systems without dismantling or destroying the original imaging system, and rely on additional hardware being added to the system. As a result, a new system that can be combined with the post processing techniques needs to be prepared for each imaging system or additional hardware has to be added to the system, which can be costly and inefficient. In addition, current imaging systems cannot collect and reconstruct images from a diverse focal region without manual intervention to adjust the system. For example, current imaging systems have no hardware that can perform autofocusing, object focal tracking, focal sweeps for extended depth of field, or user adjustable focal range.

The digital adaptive optics encoder module herein is a self-contained module that is capable of attaching and being used with many different imaging systems. When the digital adaptive optics encoder module is added to a system, the module does not rely on additional hardware being added. As a result, the digital adaptive optics encoder module is cheaper and more efficient because the module can be reused with different imaging lenses rather than being remade or modified for each specific application. Additionally, the modularity allows different modules to be attached to the digital adaptive optics encoder module for different applications making the module more versatile than traditional imaging systems. This is possible because the digital adaptive optics encoder module combines aspects of both the traditional and purely post processing techniques into a modular device that is capable of being used in multiple imaging systems. Moreover, a collection lens assembly along with a focal plane array paired with a computing module allow the digital adaptive optics encoder module the ability to autofocus, focal track objects, focal sweep for an extended depth of field, or have user adjustable focal ranges.

A digital adaptive optics encoder module includes a collection lens assembly, an input mounting flange, a collimating lens, a bandpass filter, digital adaptive optic elements, a refocusing lens, an output mounting flange, a housing, a focal plane array, a compute module, and a computing device. The collection lens assembly includes a moveable sub-lens and an entrance lens. The input mounting flange is capable of attaching to the collection lens assembly. The collimating lens is capable of expanding light from a target to fill a plurality of primary apertures. The bandpass filter has a bandwidth ranging from about 40 nm to about 100 nm. The digital adaptive optic elements include the plurality of primary apertures, an optical spreader, a focusing optic, and a detector. The refocusing lens is capable of refocusing an output from the digital adaptive optic elements onto a sensor plane. The output mounting flange is capable of attaching to the focal plane array. The housing encloses all of the interior components of the digital adaptive optics encoder module. The focal plane array measures, records, and transmits light data to a compute module. The compute module is connected to the focal plane array to receive the light data and transmits instructions to autofocus the collection lens assembly based on the light data and a storage device capable of sending and receiving the light data and storing the instructions. The computing device is capable of receiving and recording light data and images produced by the digital adaptive optics encoder module.

Referring now to FIG. 1, an example of a digital adaptive optics encoder module 100 is shown. FIG. 1 is for illustrative purposes only to aid in viewing and should not be construed as being limiting or directed to a particular material or materials. The digital adaptive optics encoder module 100 includes a collection lens assembly 102. The collection lens assembly 102 includes a movable sub-lens 106 and an entrance lens 104. The entrance lens 104 includes an aperture in a center of the entrance lens and a dielectric coating. In an example, the entrance lens 104 has an aperture diameter of about 12 mm, a thickness of about 3 mm, and a diameter of about 50 mm. In another example, the entrance lens 104 has a diameter equal to or greater than the overall diameter of the plurality of primary apertures in the digital adaptive optic elements 114. The dielectric coating is band-matched to the wavelength of incoming light. In an example, the dielectric coating has a bandwidth ranging from about 400 nm to about 750 nm.

The moveable sub-lens 106 includes linear and rotational threaded tracks. The movable sub-lens 106 is operatively connected to a motor controlled by a compute module 126. The moveable sub-lens 106 moves along threaded tracks linearly or rotationally via the motor controlled by a computing module 126. The moveable sub-lens 106 can auto-adjust based on input from the compute module 126 to autofocus, which allows the digital adaptive optics encoder module 100 to be able to focal track objects or focal sweep for an extended depth of field.

Referring back to FIG. 1, the digital adaptive optics encoder module 100 includes an input mounting flange 108 that is a mount capable of attaching to the collection lens assembly. Any lens mounting standard may be used for the input mounting flange 108. In some examples, the input mounting flange 108 may be a T-mount, a C-mount, a K-mount, a S-mount, a D-mount, or a PL-mount.

Referring back to FIG. 1, the digital adaptive optics encoder module 100 includes a first relay lens 110. In some examples, the digital adaptive optics encoder module 100 has no relay lens 110. In other examples, the digital adaptive optics encoder module 100 includes only a first relay lens 110. An example of the first relay lens 110 as shown in FIG. 1. The first relay lens 110 is located between the input mounting flange 108 and the collimating lens 112. The first relay lens 110 assists with expanding light to fill a plurality of primary apertures discussed in detail herein. The first relay lens 110 is any lens that can adjust the scale of the input aperture size by demagnifying a target to fill the digital adaptive optic element aperture 114. The target is a predetermined light source during a calibration cycle of the digital adaptive optics encoder module 100 and an external light source during normal operation of the digital adaptive optics encoder module 100.

Referring back to FIG. 1, the digital adaptive optics encoder module 100 also includes a collimating lens 112. The collimating lens 112 also assists with expanding light from the target to fill a plurality of primary apertures discussed in detail herein. The collimating lens 112 may be any plano convex lens that expands light to fill the plurality of primary apertures. In an example, the collimating lens is a 200 mm lens with a 3-inch diameter. In another example, the collimating lens 112 is a 100 mm lens with a 25 mm diameter.

The digital adaptive optics encoder module 100 also includes a bandpass filter (not depicted in FIG. 1). The bandpass filter allows specific wavelengths of light to pass from the collimating lens 112 into the digital adaptive optic elements 114. The bandpass filter may be a bandpass filter centered on any nominal wavelength and bandwidth depending on the sensor being used in the output connection discussed in detail herein. In an example, the bandpass filter is centered at a nominal wavelength of about 632 nm and has a bandwidth ranging from about 40 nm to about 100 nm.

Referring back to FIG. 1, the digital adaptive optics encoder module 100 further includes digital adaptive optic elements 114. The digital adaptive optic elements 114 remove image distortions from a target that cause interference making the image. The digital adaptive optic elements 114 include a plurality of primary apertures 201, 202, 203, an optical spreader 208 for spreading apart the light passing through the plurality of primary apertures 201, 202, 203, a focusing optic 218, and a detector 220. The digital adaptive optic elements 114 are discussed in detail herein.

Figure 2:
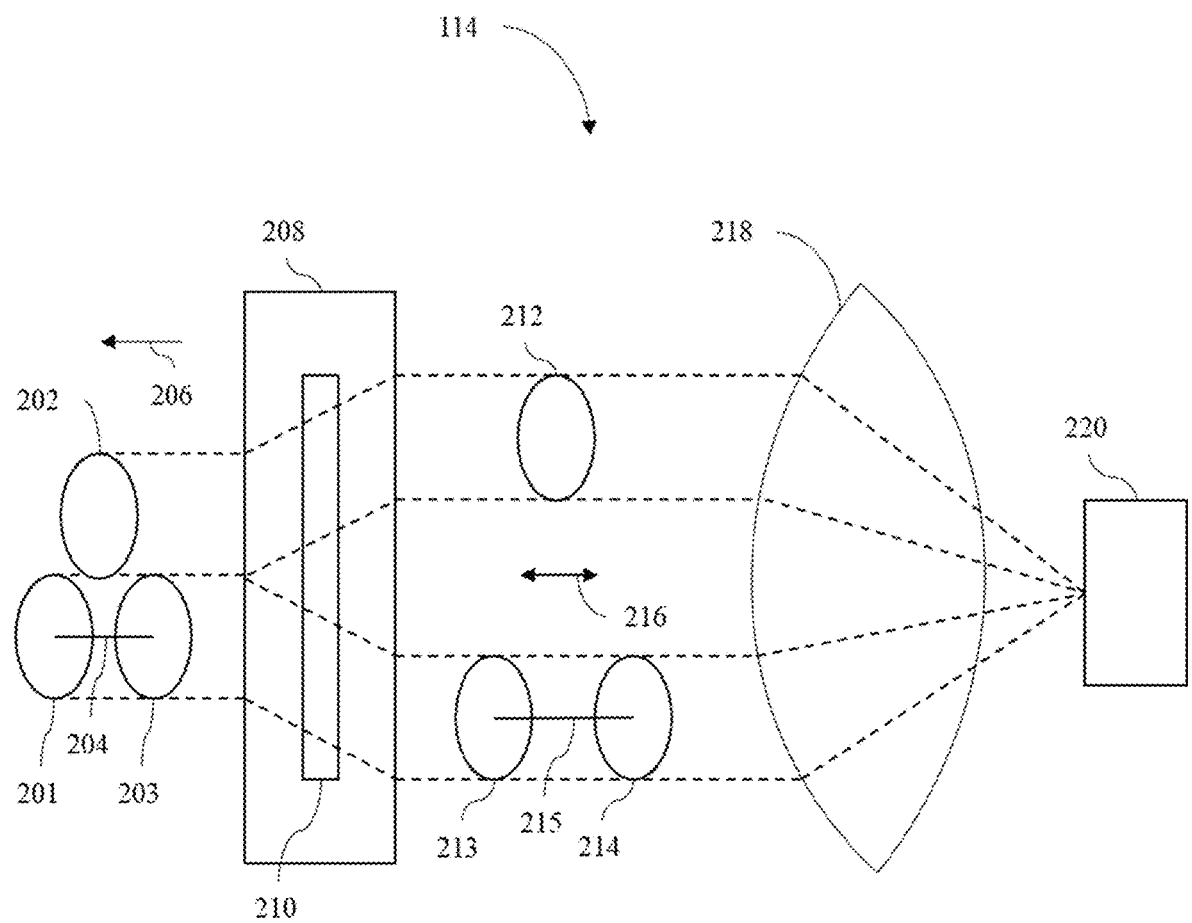
FIG. 2 is a block diagram of an example of the digital adaptive optic elements within the digital adaptive optics encoder module disclosed herein.

Referring to FIG. 2, the digital adaptive optic elements 108 include a plurality of primary apertures 201, 202, 203 for receiving light from a target. In this example, there are three primary apertures 201, 202, 203. Three primary apertures 201, 202, 203 is a typical minimum number of apertures because this enables quantifying and counteracting the piston, tip, and tilt induced from the atmospheric distortion. In other examples, there may be two or more apertures. In examples, where there are more than three apertures, the apertures quantify and counteract higher modes of atmospheric distortion.

An optical spreader 208 spreads apart the light passing through the primary apertures 201, 202, 203 by at least a factor of two times a baseline separation 204 of the primary apertures 201, 202, 203. Therefore, the baseline separation 215 of the secondary apertures 212, 213, 214 is at least a factor of two times a baseline separation 204 of the primary apertures 201, 202, 203. If the primary apertures 201, 202, 203 are circular and abut without much space between them, then the baseline separation 204 equals the diameter of each of the primary apertures 201, 202, 203, and baseline separation 215 of the secondary apertures 212, 213, 214 is at least twice the diameter of the primary apertures 201, 202, 203.

In the example shown in FIG. 2, the three primary apertures 201, 202, 203 the primary aperture 201 is spread radially away from symmetry axis 216 to yield secondary aperture 213, primary aperture 203 is spread radially away from symmetry axis 216 to yield secondary aperture 214, and primary aperture 202 is spread radially away from symmetry axis 216 to yield secondary aperture 212. In general, regardless of the number of primary apertures 201, 202, 203 the spreading includes both radial and circumferential components that arrange the secondary apertures 212, 213, 214 in a non-redundant array. For the three primary apertures 201, 202, 203 non-redundant means the centers of the three secondary apertures 212, 213, 214 are not collinear. Typically, the non-redundant array of the secondary apertures 212, 213, 214 is arranged as far as possible from any redundancy, which is achieved for the three secondary apertures 212, 213, 214 when their centers are arranged at the vertices of an equilateral triangle.

The focusing optic 218, such as a lens, focuses the light from the optical spreader 208 at the detector 220. The focusing optic 218 generates an image of the target at the detector 220, and the image at the detector 220 is a Fourier transform of the light passing through the secondary apertures 212, 213, 214, especially when the target is far away in direction 206. The detector 220 detects the image of the target with the light from the focusing optic 218.

The optical spreader 208 spreads apart the light passing through the primary apertures 201, 202, 203 by at least a factor of two times the baseline separation 204 into a non-redundant array of the secondary apertures 212, 213, 214, the modulation transfer function (MTF) of the secondary apertures 212, 213, 214 do not overlap at the detector 220. Therefore, the contribution of each of the primary apertures 201, 202, 203 can be determined from the image of the target at the detector 220 due to the optical spreader 208.

The light passing through a pairing of primary apertures 201, 203 produces a respective interference pattern superimposed on the image of the target at detector 220. The respective interference pattern for the pairing of primary apertures 201, 203 includes fringes nominally running roughly perpendicular to the baseline separation 215 of the secondary apertures 213, 214. The other pairings of primary apertures 201, 202 and of primary apertures 202, 203 similarly produce respective interference patterns. Therefore, the image of the target at detector 220 is an image of the target with superimposed and interleaved fringes of respective interference patterns. Because the optical spreader 208 spreads apart the light passing through the primary apertures 201, 202, 203 by at least the factor of two, for every pairing of two of the primary apertures 201, 202, 203, the respective interference pattern for the pairing has distinct spatial frequencies, and hence separable spatial frequencies. The respective interference patterns for the pairings of the primary apertures 201, 202, 203 occur even when the light received from the target is incoherent light.

However, the interference patterns occur only when the path lengths are matched within the digital adaptive optic elements 114. An imaged bandwidth at the detector 220 is typically 3% to 10% of the imaged wavelength, and this puts an upper bound on the coherence length at 30 to 10 wavelengths, unless the target emits monochromatic light within the bandwidth. However, a more typical coherence length is three wavelengths of light. Hence, the interference patterns occur only when the path lengths are matched within a few wavelengths of light. In some examples, as shown in FIG. 2, the digital adaptive optic elements 114 may include actuators 210, which during automatically repeated calibration cycles match the path lengths despite dynamically varying environmental conditions. With matched path lengths, the resulting interference patterns enable quantifying and counteracting the atmospheric distortion. Therefore, examples of the digital adaptive optic elements 110 include actuators 210 for modifying and matching the path lengths within the digital adaptive optic elements 110 through the primary apertures 201, 202, 203 to the detector 220. In other examples, the digital adaptive optic elements 114 do not include actuators.

The path lengths are matched when, for every pairing of two of the primary apertures 201, 202, 203 and in an absence of atmospheric distortion between the target and digital adaptive optic elements 114, the light passing through the pairing of the primary apertures 201, 202, 203 has optically equal path lengths from a respective point of the target to a corresponding point in the image of the target at the detector 220, with the respective point for the pairing of the primary apertures 201, 202, 203 imaged into the corresponding point in the image. Note that with atmospheric distortion optically equal path lengths does not imply path lengths spanning equal distances because, for example, the average index of refraction from the target to primary aperture 201 may differ from the average index of refraction from the target to primary aperture 203. This describes a piston distortion, which is detected and corrected by the digital adaptive optics encoder module 100 herein.

In the specific example in FIG. 2, the digital adaptive optic elements 114 include three circular apertures 201, 202, 203 surrounding a symmetry axis 216. The optical spreader 208 transposes the light passing through each of the three circular apertures 201, 202, 203 radially away from the symmetry axis 216 by at least the factor of two times the baseline separation 204. The baseline separation 204 equals a diameter of each of the three circular apertures 201, 202, 203. The optical spreader 208 transposes the light into a non-redundant array of secondary apertures 212, 213, 214. Actuators 210 modify the path lengths within the digital adaptive optic elements 114 through the primary apertures 201, 202, 203 to the detector 220. Example actuators 210 include liquid crystal layers inserting a variable phase delay along the path lengths within the digital adaptive optic elements 114, piezoelectric transducers driving reflective diffractive optical elements, and piezoelectric transducers driving folding mirrors along the path lengths within the digital adaptive optic elements 114. The focusing optic 218 is a lens for focusing the light from the optical spreader 208 and the secondary apertures 212, 213, 214 at the detector 220. The detector 220 is a pixelated detector for detecting the image, which is a two dimensional image of the target, with the light from the lens.

Referring back to FIG. 1, the digital adaptive optics encoder module 100 additionally includes a refocusing lens 116. The refocusing lens is capable of refocusing an output from the digital adaptive optic elements 114 onto a sensor plane of a sensor module, camera module, data acquisition module, or any other module that is attached to the output mounting flange 120 discussed in detail herein. In some examples, the refocusing lens 116 is capable of providing equal to or less than 4× magnification on the interference pattern collected on the sensor plane, which, in some examples, provides the pixel resolution required to perform the computations. The refocusing lens 116 may be any lens that matches the diameter of the output aperture of the digital adaptive optics encoder module 100. In an example, the refocusing lens is a 1-inch diameter plano-concave lens with a −75 mm focal length.

Referring now to FIG. 1, the digital adaptive optics encoder module 100 may include a second relay lens 118. In some examples, the digital adaptive optics encoder module 100 has no second relay lens 118. In other examples, the digital adaptive optics encoder module 100 has a second relay lens 118 only without a first relay lens 110. In another example, the digital adaptive optics encoder module 100 includes both a first relay lens 110 and a second relay lens 118. The second relay lens 118 is located between the refocusing lens 110 and the output mounting flange 120. The second relay lens 118 assists with directing light to the focal plane of a sensor mounted in any module that is attached to the output mounting flange 120. In an example, the second relay lens 118 is any lens that matches or exceeds the input aperture diameter of the digital adaptive optics encoder module 100. In another example, the second relay lens 118 is the same as the first relay lens 110.

Referring back to FIG. 1, the digital adaptive optics encoder module 100 includes an output mounting flange 120. The output mounting flange 120 is capable of attaching to the focal plane array 122. Any lens mounting standard may be used for the output mounting flange 120. In some examples, the output mounting flange 120 may be a T-mount, a C-mount, a K-mount, a S-mount, a D-mount, or a PL-mount. In some examples, the output mounting flange 120 is the same as the input mounting flange 108. In other examples, the output mounting flange 120 is a different mount than the input mounting flange 108.

Referring to FIG. 1, the digital adaptive optics encoder module 100 also includes a housing 122 that encloses all of the interior components of the digital adaptive optics encoder module 100. In one example, the housing 122 encloses the collimating lens 112, the bandpass filter, the digital adaptic optic encoder elements 114, and the refocusing lens 116. In another example, the housing 122 encloses the first relay lens 110 (when used in the module 100), the collimating lens 112, the bandpass filter, the digital adaptic optic encoder elements 114, and the refocusing lens 116, and the second relay lens 118 (when used in the module 100). The housing 122 may be any material that is capable of protecting all of the interior components of the digital adaptive optics encoder module 100. In an example, the housing 122 may be polyvinyl chloride (PVC). In an example, the housing 122 may taper at the on either side to match the diameter of the input mounting flange 108 or output mounting flange 120 as shown in FIG. 1. In another example, the housing 122 may be the same diameter around the digital adaptive optics encoder module 100.

Figure 3A:
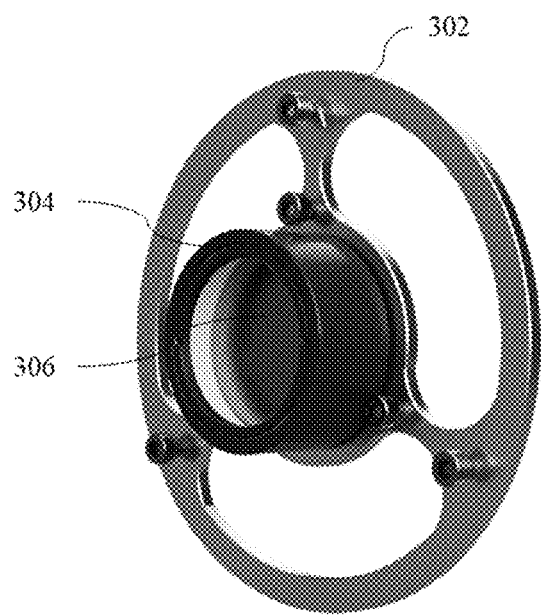
FIG. 3A-3B are examples of the focal plane array without and with a spatial filtering mask, respectively.
Figure 3B:
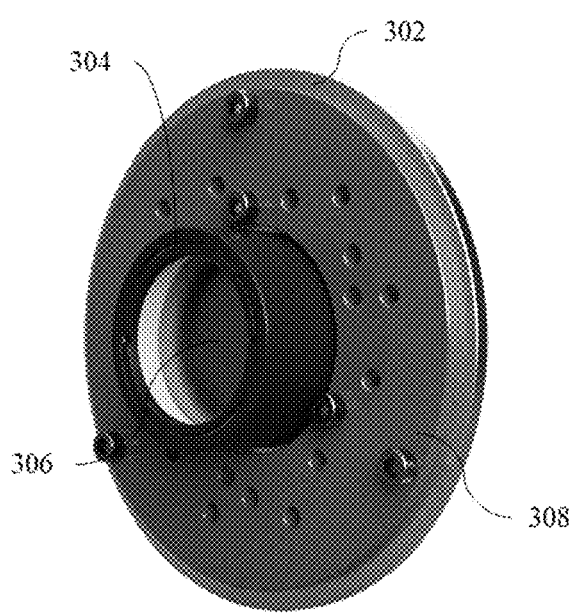

Referring now to FIG. 3, an example of the focal plane array 124 is shown. The focal plane array 124 measures, records, and transmits light data to a compute module 126. The focal plane array 124 includes a spider frame 302 with an optical tube 304 that holds a dielectric mirror 306. The dielectric mirror 306 may be a broadband dielectric mirror or a narrowband dielectric mirror depending on the digital adaptive optic encoder module 100 application. The spider frame 302 encloses the optical tube 304 as shown in FIG. 3. The focal plane array 124 also includes a spatial filter mask with a plurality of special filter mask apertures that match positions of the secondary apertures 212, 213, 214 of the digital adaptive optic elements. In an example, the focal plane array 124 may be any type of sensor that matches the wavelength of the interferometer system and is capable of outputting the data to the compute module 126. In an example, the focal plane array 124 may be a CMOS sensor that outputs data via USB to the compute module 126.

Referring back to FIG. 1, the digital adaptive optics encoder module 100 includes a compute module 126. The computer module 126 is connected to the focal plane array 124 to receive the light data and transmit instructions to autofocus the collection lens assembly 102 based on the light data and a storage device capable of sending and receiving the light data and storing the instructions. In an example, the computing module is any sensor capable of receiving the light data and transmitting instructions to autofocus the collection lens assembly 102 based on the light data. In an example, the compute module 126 is a field programmable gate array, an application-specific integrated circuit, a central processing unit, a sensor, or a combination thereof operatively connected to the focal plane array 124, the computing device 128, and the moveable sub-lens 106.

Referring back to FIG. 1, the digital adaptive optics encoder module 100 includes a computing device 128. The computing device 128 is capable of receiving and recording light data and processing the light data produced by the digital adaptive optics encoder module 100 into an image. The computing device 128 can process the incoming imaging data and create a digital image (i.e., digitize the incoming light). In an example, the computing device 128 may be any computing device capable of receiving and recording light data and processing the light data produced by the digital adaptive optics encoder module 100 into an image. In an example, the computing device 128 may be a standalone device capable of processing and digitizing the target or the computing device 128 may be part of a computer (e.g., a CPU). The computing device 128 may be connected wirelessly to the compute module 126 or wired directly to the compute module 126 to digitally process the incoming data to generate a digital image.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0.1 to about 20 should be interpreted to include not only the explicitly recited limits of from about 0.1 to about 20, but also to include individual values, such as 3, 7, 13.5, etc., and sub-ranges, such as from about 5 to about 15, etc.

In describing and claiming the examples disclosed herein, the singular forms "a", "an", and "the" include plural referents unless the context clearly dictates otherwise.

What is claimed is:

1. A digital adaptive optics encoder module, comprising:
   a collection lens assembly, wherein the collection lens assembly includes a moveable sub-lens and an entrance lens;
   input mounting flange, wherein the input mounting flange is a mount capable of attaching the collection lens assembly;
   collimating lens, wherein the collimating lens is capable of expanding light from a target to fill a plurality of primary apertures;
   bandpass filter, wherein has a bandwidth ranging from about 40 nm to about 100 nm;
   digital adaptive optic elements, wherein the digital adaptive optic elements include:
   i) the plurality of primary apertures for receiving light from the target;
   ii) an optical spreader for spreading apart the light passing through the primary apertures by at least a factor of two times a baseline separation of the primary apertures;
   iii) a focusing optic for focusing the light from the optical spreader at the detector; and iv) the detector for detecting an image of the target with the light from the focusing optic;

refocusing lens, wherein the refocusing lens is capable of refocusing an output from the digital adaptive optic elements onto a sensor plane;

output mounting flange, wherein the output mounting flange is a mount capable of attaching to a focal plane array;

a housing, wherein the housing encloses the collimating lens, the bandpass filter, the digital adaptic optic encoder elements, and the refocusing lens;

the focal plane array, wherein the focal plane array measures, records, and transmits light data to a compute module;

the compute module, wherein the computer module is connected to the focal plane array to receive the light data and transmit instructions to autofocus the collection lens assembly based on the light data and a storage device capable of sending and receiving the light data and storing the instructions; and a computing device, wherein the computing device is capable of receiving and recording light data and processing the light data produced by the digital adaptive optics encoder module into an image.

2. The digital adaptive optics encoder module of claim 1, wherein the entrance lens includes an aperture in a center of the entrance lens and a dielectric mirror coating.

3. The digital adaptive optics encoder module of claim 1, wherein the focal plane array includes an optical tube that holds a dielectric mirror.

4. The digital adaptive optics encoder module of claim 3, wherein the focal plane array includes a spider frame that encloses the optical tube.

5. The digital adaptive optics encoder module of claim 1, further including secondary apertures in the digital adaptive optic elements wherein the optical spreader transposes the light into the secondary apertures and the focal plane array includes a spatial filter mask with a plurality of special filter mask apertures that match positions of secondary apertures.

6. The digital adaptive optics encoder module of claim 1, wherein the moveable sub-lens moves along threaded tracks linearly or rotationally via a motor controlled by the compute module.

7. The digital adaptive optics encoder module of claim 1, wherein the compute module is a sensor capable of transmitting the light data to the computing device.

8. The digital adaptive optics encoder module of claim 7, wherein the compute module is a field programmable gate array, an application-specific integrated circuit, a central processing unit, a sensor, or a combination thereof.

9. The digital adaptive optics encoder module of claim 2, wherein the entrance lens has a diameter larger than or equal to the overall diameter of the plurality of primary apertures in the digital adaptive optic elements.

10. The digital adaptive optics encoder module of claim 1 further including a first relay lens and a second relay lens, wherein the first relay lens is located between the input mounting flange and the collimating lens and the second relay lens is located between the refocusing lens and the output mounting flange.

11. The digital adaptive optics encoder module of claim 2, wherein the first relay lens adjusts a scale of an input aperture size by demagnifying the target to fill the digital adaptive optic element aperture and the second relay lens matches or exceeds an input aperture diameter of the digital adaptive optics encoder module.

12. A digital adaptive optics encoder module, comprising:

a collection lens assembly, wherein the collection lens assembly includes a moveable sub-lens and an entrance lens;

input mounting flange, wherein the input mounting flange is a mount capable of attaching the collection lens assembly;

a first relay lens, wherein the first relay lens adjusts a scale of an input aperture size by demagnifying the target to fill the digital adaptive optic element aperture;

collimating lens, wherein the collimating lens is capable of expanding light from a target to fill a plurality of primary apertures;

bandpass filter, wherein has a bandwidth ranging from about 40 nm to about 100 nm;

digital adaptive optic elements, wherein the digital adaptive optic elements include:
  i) the plurality of primary apertures for receiving light from the target;
  ii) an optical spreader for spreading apart the light passing through the primary apertures by at least a factor of two times a baseline separation of the primary apertures;
  iii) a focusing optic for focusing the light from the optical spreader at the detector; and
  iv) the detector for detecting an image of the target with the light from the focusing optic;

refocusing lens, wherein the refocusing lens is capable of refocusing an output from the digital adaptive optic elements onto a sensor plane;

output mounting flange, wherein the output mounting flange is a mount capable of attaching to a focal plane array;

a second relay lens, wherein the second relay lens matches or exceeds an input aperture diameter of the digital adaptive optics encoder module;

a housing, wherein the housing encloses the collimating lens, the bandpass filter, the digital adaptic optic encoder elements, and the refocusing lens;

the focal plane array, wherein the focal plane array measures, records, and transmits light data to a compute module;

the compute module, wherein the computer module is connected to the focal plane array to receive the light data and transmit instructions to autofocus the collection lens assembly based on the light data and a storage device capable of sending and receiving the light data and storing the instructions; and a computing device, wherein the computing device is capable of receiving and recording light data and processing the light data produced by the digital adaptive optics encoder module into an image.

13. The digital adaptive optics encoder module of claim 12, wherein the entrance lens includes an aperture in a center of the entrance lens and a dielectric mirror coating.

14. The digital adaptive optics encoder module of claim 12, wherein the focal plane array includes an optical tube that holds a dielectric mirror.

15. The digital adaptive optics encoder module of claim 14, wherein the focal plane array includes a spider frame that encloses the optical tube.

16. The digital adaptive optics encoder module of claim 12, further including secondary apertures in the digital adaptive optic elements wherein the optical spreader transposes the light into the secondary apertures and the focal plane array includes a spatial filter mask with a plurality of special filter mask apertures that match positions of secondary apertures.

17. The digital adaptive optics encoder module of claim 12, wherein the moveable sub-lens moves along threaded tracks linearly or rotationally via a motor controlled by a computing device.

18. The digital adaptive optics encoder module of claim 12, wherein the compute module is a sensor capable of transmitting the light data to the computing device.

19. The digital adaptive optics encoder module of claim 18, wherein the compute module is a field programmable gate array, central processing unit, an application-specific integrated circuit, a sensor, or a combination thereof.

20. The digital adaptive optics encoder module of claim 2, wherein the entrance lens has a diameter larger than or equal to the overall diameter of the plurality of primary apertures in the digital adaptive optic elements.

* * * * *